United States Patent
Bartolotta et al.

(10) Patent No.: US 6,717,611 B2
(45) Date of Patent: Apr. 6, 2004

(54) MULTIPLE CHANNEL VIDEO RECORDING USING A SINGLE VIDEO BUS

(75) Inventors: Jonathan Bartolotta, Edo Miranda (VE); Antonio Mugica, Boca Raton, FL (US); Glauco Rocco, Caracas (VE)

(73) Assignee: Smart Matic, Corp., Boca Raton, FL (US)

(*) Notice: Subject to any disclaimer, the term of this patent is extended or adjusted under 35 U.S.C. 154(b) by 124 days.

(21) Appl. No.: 09/682,079

(22) Filed: Jul. 17, 2001

(65) Prior Publication Data

US 2003/0097660 A1 May 22, 2003

(51) Int. Cl.[7] ................................................ H04N 7/18
(52) U.S. Cl. ....................................... 348/159; 725/105
(58) Field of Search ................................ 348/142–160; 725/102–106

(56) References Cited

U.S. PATENT DOCUMENTS 5,264,929 A * 11/1993 Yamaguchi ................. 348/159
5,995,140 A * 11/1999 Cooper et al. ............... 348/159
6,008,867 A * 12/1999 Cooper et al. ............... 348/705

* cited by examiner

*Primary Examiner*—Andy Rao
(74) *Attorney, Agent, or Firm*—Jeffrey Furr

(57) ABSTRACT

In the preferred embodiment this video system comprises a master control unit 52, several slave devices 50 connected to a video camera, a videotape recorder and a video monitor. This system adds video bus capabilities to a standard video system, so a standard video surveillance system may be upgraded to a video bus system without major changes. The video bus system requires an external control device because an embedded controller could limit the final application to a single manufacturer. Using this approach, the videotape recorders and cameras may be standard systems, and the control of the video bus system resides in the external control device, adding features without any major changes.

16 Claims, 7 Drawing Sheets

Figuer 2

MULTIPLE CHANNEL VIDEO RECORDING USING A SINGLE VIDEO BUS

BACKGROUND OF INVENTION

This invention relates to a method and apparatus to implement a video bus network using standard video components (videotape recorders and cameras).

BACKGROUND DISCUSSION OF PRIOR ART

Video surveillance systems are mostly used in banking applications. Their use, however, may extend to government sites and several other locations where security is an important issue.

Traditional video systems are illustrated on FIG. 1. This type of system comprises a scanning device 22, a monitor 20, a videotape recorder 20 and several cameras 24. Each camera has a dedicated connection to the scanning device. The scanning device selects an image from a camera, displays it for a few seconds, records it in the videotape, and then switches to the next camera. If the system operator detects an unusual event on video, he may switch to the camera that recorded that event and follow the suspect until either a criminal act is committed or the suspect leaves the protected area. All these events are recorded on videotape so that security officers may search the videotape for events in the past.

This design, however, has several drawbacks. For instance, the recording system only stores the current image on display. In a large system comprising several cameras, it may take a long time for the system to return to any one camera. Thus, a person can take advantage of this and commit a criminal act without being recorded by the video system.

Another drawback of this system is its physical connection. Each camera has a dedicated link to the main scanning system. Thus, a large system requires an equally large number of dedicated connections. As the system grows, the connection setup will become harder.

A partial solution to this problem has been proposed in the past (U.S. Pat. No. 6,104,428), by means of a system comprising a single video bus, several camera systems and a special monitor-control unit (FIG. 2). The camera systems (FIG. 4) comprise a microcontroller 44 and a video switch 42. The microcontroller adds addressing capabilities to the camera and manages the video switch. Hence, only the camera system with a correct address may transmit video. The control unit manages the address and selects the active camera.

This system transmits control signals using a vertical retrace signal. The control signal is modulated an embedded on the vertical retrace section of the video signal. Using this, only one link is used to connect several cameras and the control unit. The control unit encodes the control signals, and must have video recording capabilities. This is a significant drawback, since the recording unit must be able to encode the control signal, making it difficult to set up using standard components.

In addition, the camera system has a demodulator embedded on the video switch 42, increasing its complexity. The full system cannot work using standard components, limiting this system to a brand name. This limitation results in a system incompatible with industry standards.

The use of a unique link for both control and video signals has a major drawback: if the connection between a device and the main system is lost, both video and control signals will be lost, and the system will not be able to automatically detect the failure.

SUMMARY OF INVENTION

A video bus system must be flexible and independent from its components. Such design requires the addition of external components to control the video signals. The use of external components does not degrade the quality of the video signal and adds more features to the complete video system.

The target of this design is to have an independent control system. Using dedicated master and slave devices, the video bus system remains independent of manufacturers. Finally, using separate video and control signals provides the ability to detect failures in slave devices.

OBJECTS AND ADVANTAGES OF THE INVENTION

The main object of the present system is to implement multi-channel video recording using a single video bus and standard video components.

Accordingly, several objects of this system are:
a) Easy setup: The use of a single video bus makes it easier to set up the system. All cameras use the same link, so adding new cameras is very simple;
b) Compatibility: The use of standard video components makes for a more flexible system. Cameras may come from different manufacturers;
c) Image storage flexibility: The image storage device may be a standard videotape recorder or any other video storage device. The storage device operates independently of the system controller.

The main advantage of this invention is the use of a master controller device, i.e., a microcontroller-based device able to perform several management functions. The master control unit does not depend on the video recording system. Thus, either the system or the master controller may be upgraded without major changes to the other part.

The slave system uses standard video cameras 68 (FIG. 7). The control signals reside in a separate bus (video bus 49 and control bus 51), so that the main system may detect video bus failures. In addition, the encoding of control signals is easier and independent of the video signal.

LIST OF REFERENCE NUMERALS

20-Monitor or Videotape recorder 22-Scanning device24-Camera26-Video Monitor28-Videotape recorder Master control unit30-Slave Camera System32-Videotape recorder34-Modulator demodulator encoder36-Microcontroller38-Video link40-Video camera42-Decoder demodulator video switch44-microcontroller46-Video monitor videotape recorder48-Keypad49-Video bus50-Slave device51-Data control bus52-Master video controller54-Personal Computer (secondary-extended control device)56-Personal computer link58-Microcontroller 60-Master video switch62-Transceiver64-Keypad (primary control device)66-Microcontroller68-Video camera70-Video switch72-Transceiver.

DETAILED DESCRIPTION

Figure 1:
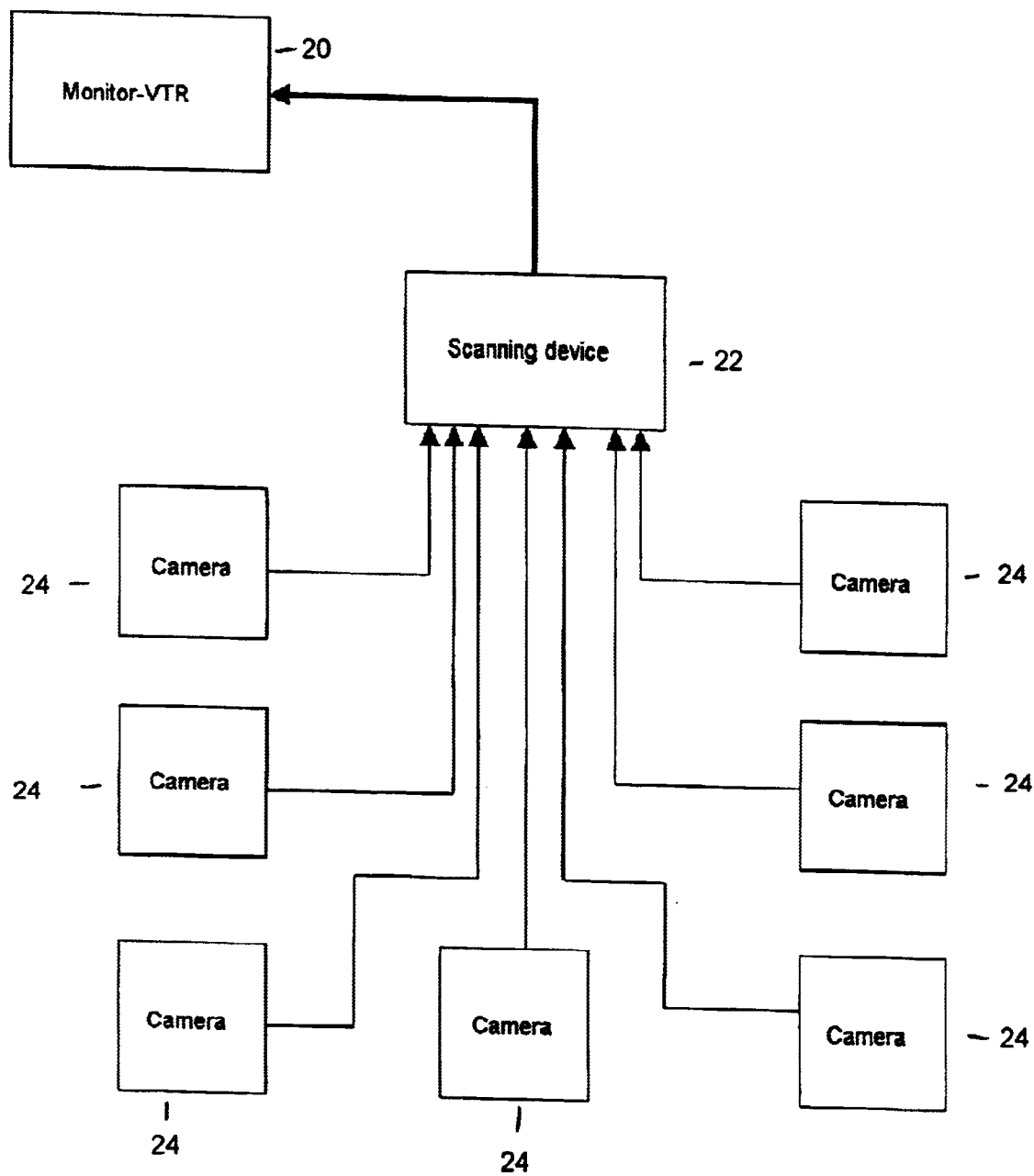
FIG. 1 illustrates a standard video surveillance system, and shows how each camera comprises a dedicated connection to the scanning device.
Figure 2:
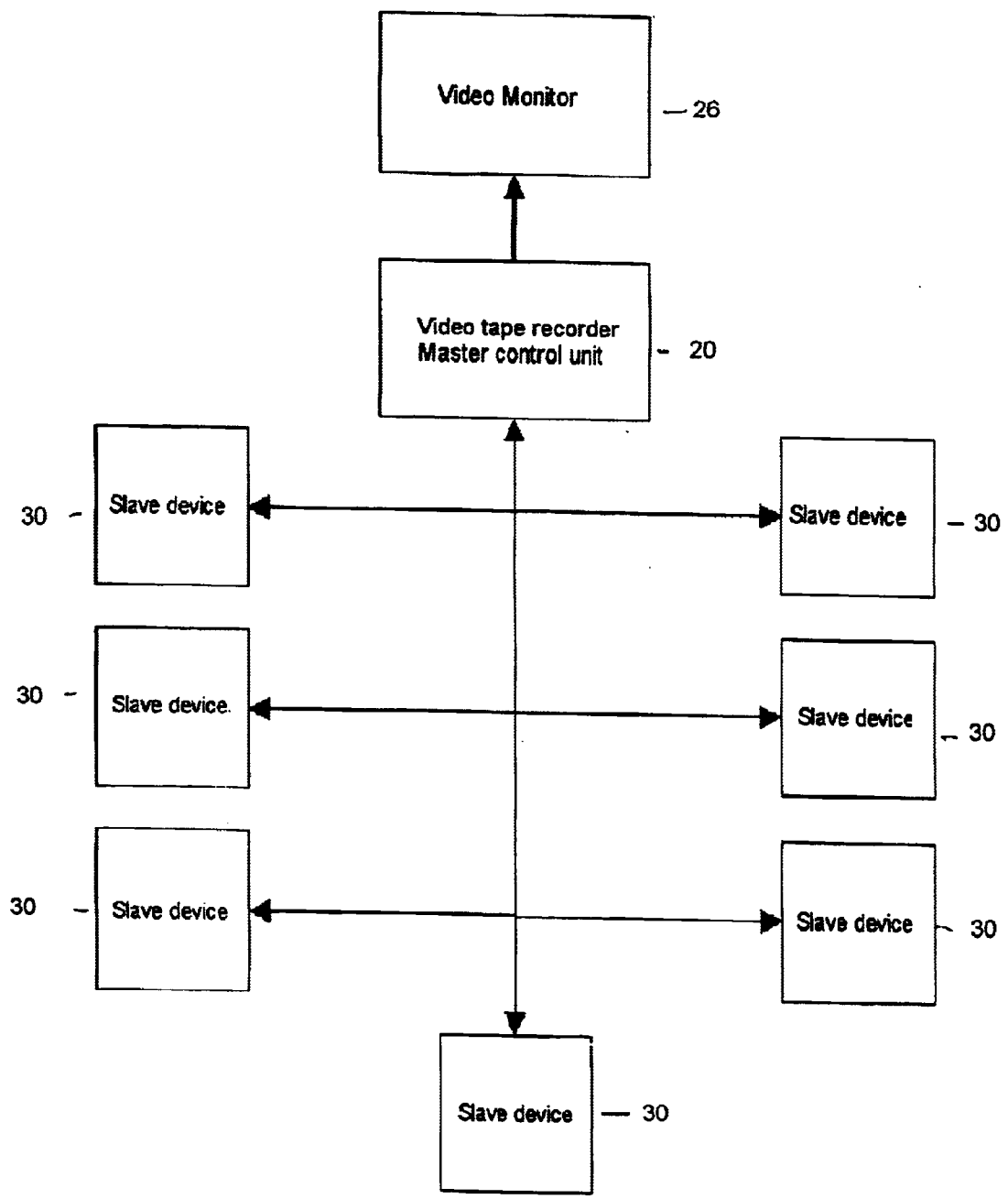
FIG. 2 shows a previous approach to a video bus system in U.S. Pat. No. 6,104,428.
Figure 3:
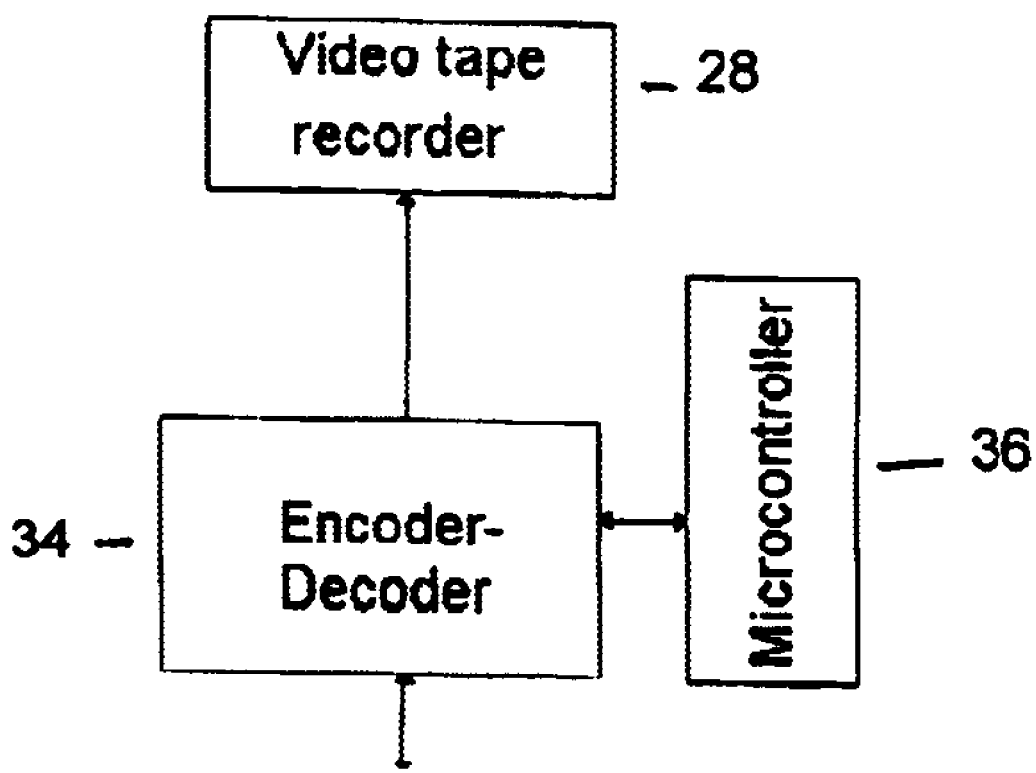
FIG. 3 shows a block diagram of the main control device of FIG. 2. The encoder is required to join the control signal with the video signal.
Figure 4:
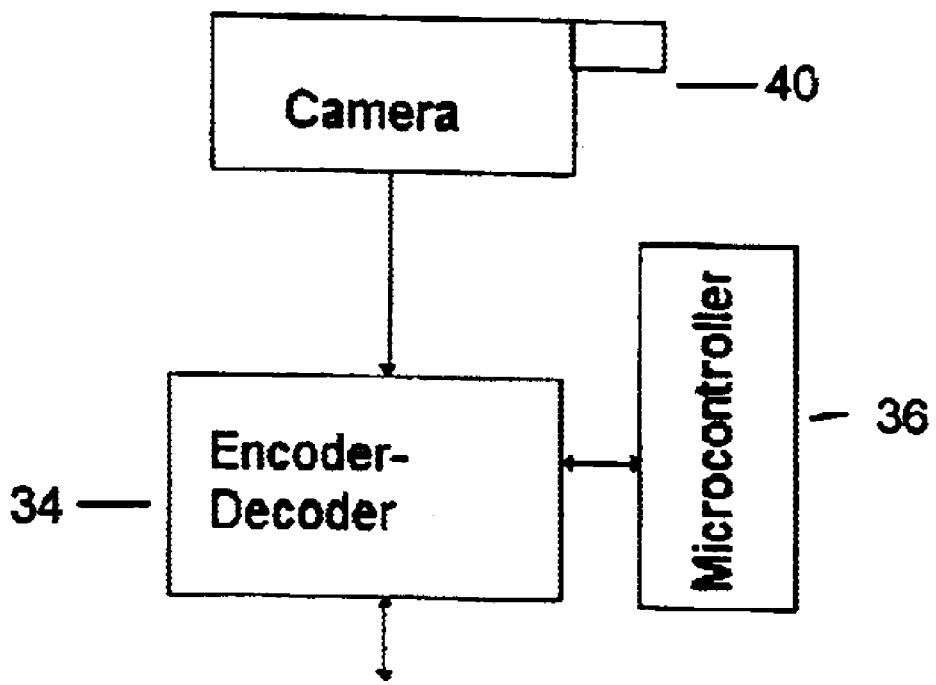
FIG. 4 shows the camera system used in FIG. 2. It shows the relationship between the camera and the rest of the system. This is not a standard video camera because it comprises embedded external components.
Figure 5:
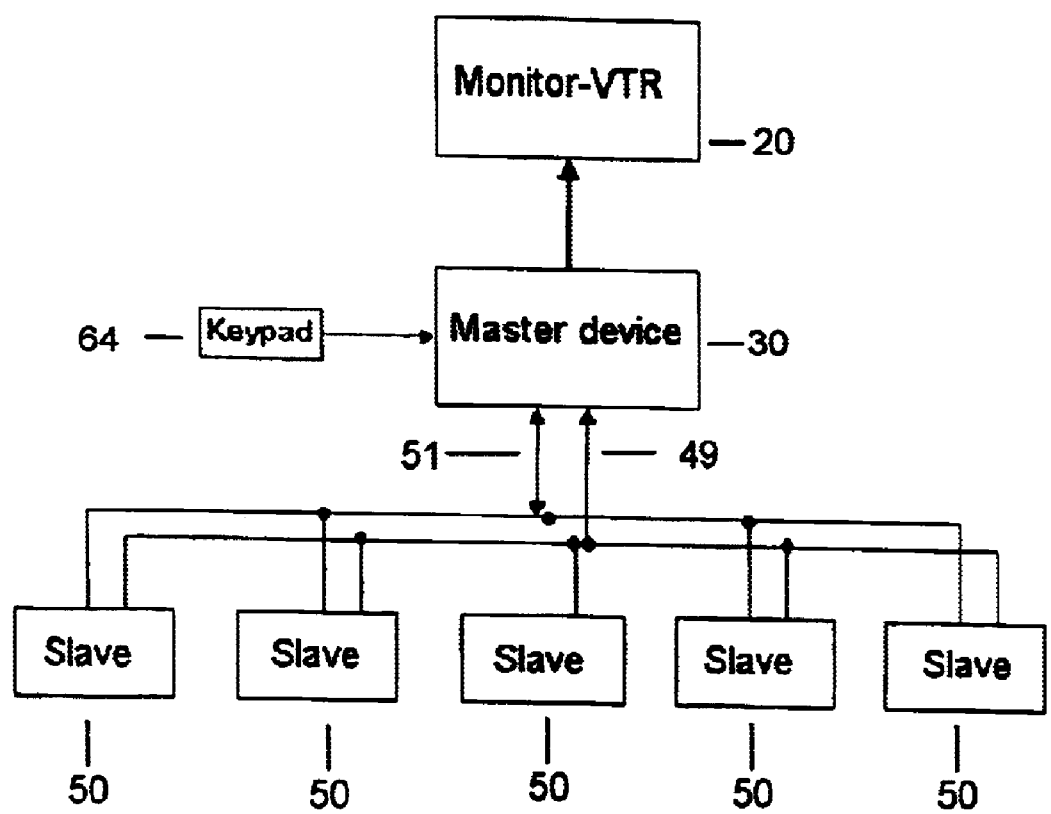
FIG. 5 illustrates the video bus system disclosed in the present patent. The video and control signals use different links. The system does not depend on the cameras or the video recording systems.
Figure 6:
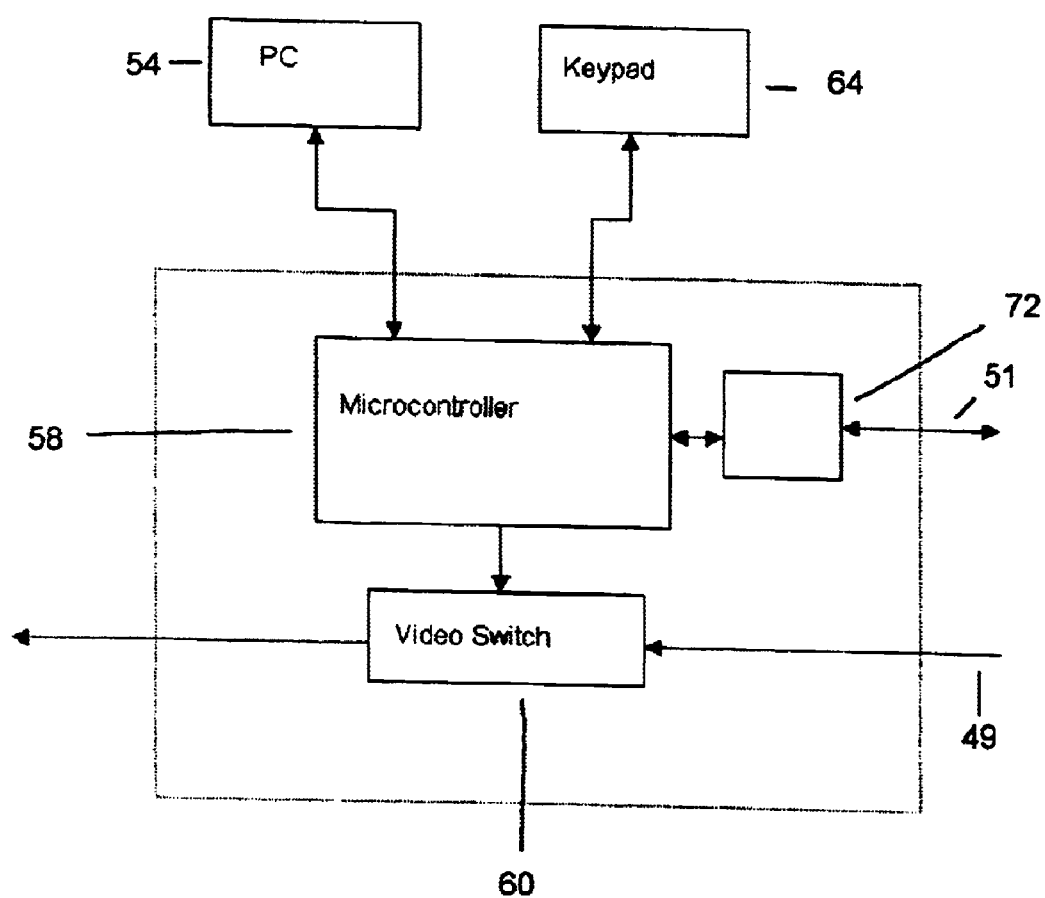
FIG. 6 shows the main control system, and its internal block diagram including all interconnection details.

The video bus system disclosed herein (FIG. 5) comprises two basic components: the master video controller 52 and several slave devices 50. The master video controller (FIG. 6) comprises a microcontroller 58, a video switch 60, a keypad 64, a transceiver 62 and a personal computer interface 56 that enables a personal computer (PC) 54 to take control over the system.

The master video controller enables the video switch 60, manages the automatic switch system, generates the slave's active address, and transmits video. It also comprises external control interfaces. External control devices may include a keypad 64, a PC 54 or both. The video switch implements a master on/off switch that controls the video output of the master system.

The transceiver encodes the data generated by the microcontroller and sends it through the data bus 51. The main external control interface is keypad-based, allowing local system control (a remote control interface may also be used). This kind of interface is PC-based, and permits system remote control. The remote system connection 56 may use twisted-pair or Ethernet wires or be a wireless link. The master controller may support any of these schemes of remote control unit connectivity.

Figure 7:
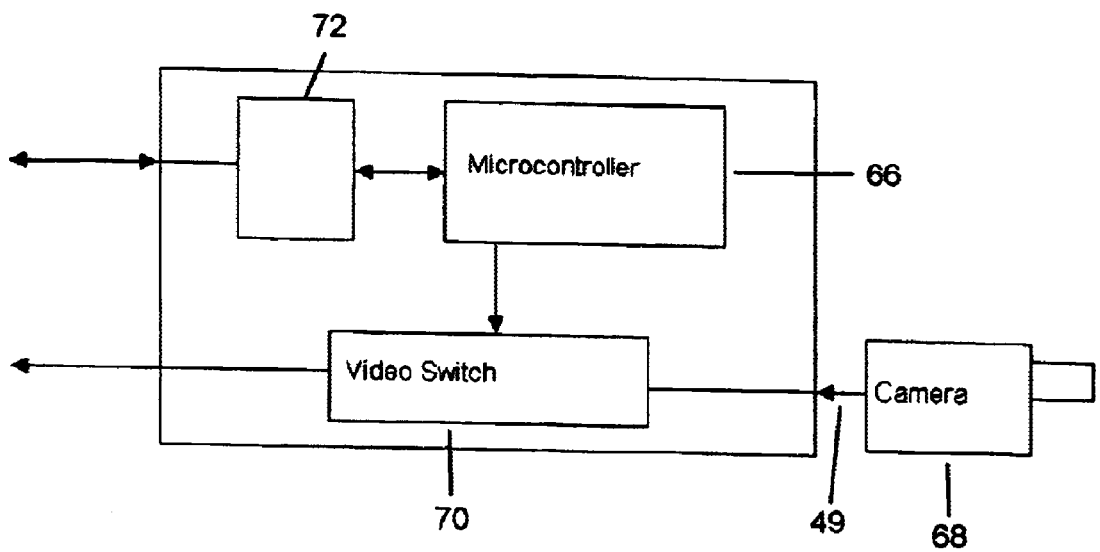
FIG. 7 shows the slave devices attached to the video bus. This diagram shows that the slave device does not include a camera, so that different cameras by different manufacturers may be used. The slave device's internal configuration is also shown, including the interactions among its components.

The slave device (FIG. 7) comprises a standard composite video camera 68, a video switch 70, a microcontroller 66 and a transceiver 72. Depending on transceiver selection, the number of active slaves may vary. A standard slave count is 16, but greater slave numbers are supported. The slave device uses EEPROM memory to store its current address, and permits its master device to change it dynamically. This allows easier system upgrades.

OPERATION OF THE INVENTION

This video bus system has two operating modes: automatic mode and manual mode, both of which are defined in the master system 52. In automatic mode, the system switches sequentially among all slave addresses. This switch operates at a rate of one frame per second. The speed of the switch depends on the number of slaves 50 present in the system, the greater number of slave devices, the lower the automatic mode switch rate. This basic frame rate (i.e., 1 frame per second) is calculated using an industry-standard number of imaging devices (i.e., 16 cameras). When the operator detects something unusual, he may switch to manual mode, in which the operator may select a desired slave device 50. The system thus permits the operator to scan the protected area in different ways, or trace a suspicious activity.

When the main system is controlled using a personal computer 54, extended features are present. These features, however, depend on the application running in the PC. The basic functionality is present, and the PC adds more flexibility and better integration with other security systems (e.g., access control systems). Use of a personal computer may enable features, such as system remote control through a local area network. If the personal computer has video storage abilities, it may be used as a monitor as well. The result is that the complete system may be controlled using a single computer connected to a network.

CONCLUSION, RAMIFICATIONS, AND SCOPE OF THE INVENTION

The video system disclosed herein was designed for ease of setup and flexibility. Its main components may be upgraded without major changes to the system. The system's independence allows interaction among several different cameras and video recording systems.

This system may be part of a complete surveillance system because the design of the master controller permits interoperability between different security systems. The design, however, is not limited to the present embodiment because the flexibility of the system core permits that the design be modified to suit user requirements.

The single-bus solution disclosed herein may be implemented using variations of this basic scheme, but it will be based on the same components. Other variations of the system may be done according to specific user needs. More features may be added, e.g., the system may use a digital video recorder and remote PC-based control. This way, the video system may be network-ready and the control of the system may occur remotely.

All this extended features depend on the ability of the master controller to be network-capable. Remotely controlling a video bus system is possible and is in the scope of the present disclosure.

What is claimed is:

1. A video bus network system comprising: A master video controller consisting of a microcontroller means with a memory means, a video switch, a keypad means, a transceiver means and a external control interface for said master video controller which enables the video switch, manages an automatic switch means, generates the slave's active address, and transmits video; a plurality of slave devices consisting of a standard composite video camera, a video switch, a microcontroller means and a transceiver means; a data bus; a video bus, with said master video transceiver means encoding the data generated by the microcontroller and transmitting data signal through the data bus and said slave devices transmitting video through the video bus to said master video controller.

2. A video bus network system in claim 1 further comprising said video switch serves as a master on/off switch that controls the video output of the master system.

3. A video bus network system in claim 1 further comprising said slave device uses an EEPROM memory means to store its current address and said master device can change the address dynamically.

4. A video bus network system in claim 1 further comprising control signals residing on a said data bus only and said video signals residing on said video bus only.

5. A video bus network system in claim 1 further comprising said data bus is a remote control unit connectivity.

6. A video bus network system in claim 1 further comprising two operating modes: An automatic mode in which the system switches sequentially among all slave addresses; and a manual mode in which the operator selects a desired slave device.

7. A video bus network system in claim 1 further comprising having an operator switch to a manual mode if there is a detection of something unusual.

8. A video bus network system in claim 1 further comprising said system is controlled using a personal computer with video storage abilities.

9. A method to transmit video from multiple cameras over a single bus, using separate video and data buses, comprising the following steps: having a master video controller consisting of a microcontroller means, a video switch, a keypad means, a transceiver means and a external control interface with said master video controller enabling the video switch, managing an automatic switch means, generate ring the slave's active address, and transmitting video: having a plurality of slave devices consisting of a standard composite video camera, a video switch, a microcontroller means and a transceiver means: having a data bus: having said master video transceiver means encodes the data generated by the microcontroller and sends it, having a video bus and having said slave devices transmitting video through the video bus to said master video controller.

10. The method of claim 9 further comprising said video switch implements a master on/off switch that controls the video output of the master system.

11. The method of claim 9 further comprising said slave device uses an EEPROM memory means to store its current address and said master device can change the address dynamically.

12. The method of claim 9 further comprising said control signals residing on said data bus only and said video signals residing on said video bus only.

13. The method of claim 9 further comprising said data bus is a remote control unit connectivity.

14. The method of claim 9 further comprising two operating modes: an automatic mode in which the system switches sequentially among all slave addresses; and a manual mode in which the operator selects a desired slave device.

15. The method of claim 9 further comprising having an operator switch to a manual mode if those is a detection of something unusual.

16. The method of claim 9 further comprising said system is controlled using a personal computer with video storage abilities.

* * * * *